(12) United States Patent
Laza et al.

(10) Patent No.: US 11,157,783 B2
(45) Date of Patent: Oct. 26, 2021

(54) TRAINING OPTICAL CHARACTER DETECTION AND RECOGNITION MODELS FOR ROBOTIC PROCESS AUTOMATION

(71) Applicant: UiPath, Inc., New York, NY (US)

(72) Inventors: Dorin Andrei Laza, Bucharest (RO); Trong Canh Nguyen, Paris (FR)

(73) Assignee: UiPath, Inc., New York, NY (US)

( * ) Notice: Subject to any disclaimer, the term of this patent is extended or adjusted under 35 U.S.C. 154(b) by 104 days.

(21) Appl. No.: 16/700,494

(22) Filed: Dec. 2, 2019

(65) Prior Publication Data

US 2021/0166093 A1 Jun. 3, 2021

(51) Int. Cl.
*G06K 9/72* (2006.01)
*G06F 9/455* (2018.01)

(52) U.S. Cl.
CPC .......... *G06K 9/72* (2013.01); *G06F 9/45512* (2013.01); *G06K 2209/01* (2013.01)

(58) Field of Classification Search
CPC ... G06K 9/72; G06K 2209/01; G06F 9/45512
See application file for complete search history.

(56) References Cited

U.S. PATENT DOCUMENTS

| 9,858,496 B2 | 1/2018 | Sun et al. |
| 10,890,898 B2 | 1/2021 | Akella et al. |
| 2007/0271552 A1 | 11/2007 | Pulley |
| 2016/0203380 A1 | 7/2016 | Bulan et al. |
| 2016/0307061 A1 | 10/2016 | Bulan et al. |
| 2017/0206431 A1 | 7/2017 | Sun et al. |
| 2018/0157386 A1 | 6/2018 | Su |
| 2018/0189609 A1 | 7/2018 | Park et al. |
| 2018/0197123 A1 | 7/2018 | Parimelazhagan et al. |
| 2019/0163499 A1 | 5/2019 | Kebets et al. |
| 2019/0205638 A1 | 7/2019 | Zhang et al. |

(Continued)

FOREIGN PATENT DOCUMENTS

| CN | 109685100 A | 4/2019 |
| CN | 109697442 A | 4/2019 |

(Continued)

OTHER PUBLICATIONS

I. Zeki Yalniz et al., "Billion-scale semi-supervised learning for state-of-the-art image and video classification," available at https://ai.facebook.com/blog/billion-scale-semi-supervised-learning/ (published Oct. 18, 2019).

(Continued)

*Primary Examiner* — Mark Roz
(74) *Attorney, Agent, or Firm* — LeonardPatel PC; Michael A. Leonard, II; Sheetal S. Patel (57) ABSTRACT

Techniques for training an optical character recognition (OCR) model to detect and recognize text in images for robotic process automation (RPA) are disclosed. A text detection model and a text recognition model may be trained separately and then combined to produce the OCR model. Synthetic data and a smaller amount of real, human-labeled data may be used for training to increase the speed and accuracy with which the OCR text detection model and the text recognition model can be trained. After the OCR model has been trained, a workflow may be generated that includes an activity calling the OCR model, and a robot implementing the workflow may be generated and deployed.

16 Claims, 8 Drawing Sheets

(56) References Cited

U.S. PATENT DOCUMENTS

2019/0311210 A1 10/2019 Chatterjee et al.
2020/0320786 A1 10/2020 Kadoury et al.

FOREIGN PATENT DOCUMENTS

| CN | 110135427 A | 8/2019 |
| KR | 1020190095651 A | 8/2019 |
| WO | 2019068141 A1 | 4/2019 |

OTHER PUBLICATIONS

Raja Bala et al., "Image simulation for automatic license plate recognition," Proc. of SPIE—IS&T, vol. 8305, pp. 83050Z-1 to 83050Z-9 (2012).

Saad Hassan et al., "Extraction and Classification of User Interface Components from an Image," International Journal of Pure and Applied Mathematics, vol. 118, No. 24 (2018).

Shaoqing Ren et al., "Faster R-CNN: Towards Real-Time Object Detection with Region Proposal Networks," Advances in Neural Information Processing Systems 28, published at the Neural Information Processing Systems (NIPS) Conference (2015).

Tensorflow models available at https://github.com/tensorflow/models/tree/master/research/object_detection (last accessed Aug. 12, 2019).

Viswanath Sivakumar et al., "Rosetta: Understanding text in images and videos with machine learning," available at https://engineering.fb.com/ai-research/rosetta-understanding-text-in-images-and-videos-with-machine-learning/ (posted Sep. 11, 2018).

Xiao-Yun Zhou et al., "Atrous Convolutional Neural Network (ACNN) for Semantic Image Segmentation with full-scale Feature Maps," available at https://arxiv.org/pdf/1901.09203.pdf (last accessed Aug. 12, 2019).

International Search Report and Written Opinion of the International Search Authority (KIPO) issued for PCT Application No. PCT/US2020/045830 dated Nov. 11, 2020.

International Search Report and Written Opinion of the International Search Authority issued by the Korean Intellectual Property Office (KIPO) dated Nov. 30, 2020.

Kevin Moran et al., "Machine Learning-Based Prototyping of Graphical User Interfaces for Mobile Apps.," IEEE Transactions on Software Engineering, pp. 1-26 (May 2018).

Shaoqing Ren et al., "Faster R-CNN: Towards Real-Time Object Detection with Region Proposal Networks," Microsoft Research, pp. 1-9 (Jun. 4, 2015).

UiPath, Inc., UiPath Studio—Basic Concepts YouTube Video, available at https://www.youtube.com/watch?v=dDbiQpqA7S0 (Jul. 22, 2014).

Charlotte M Baker, "Notice of Allowance", dated Mar. 3, 2021, U.S. Appl. No. 16/595,727.

RELATED ART

FIG. 1A

Faster R-CNN for Graphical Element Detection

TRAINING OPTICAL CHARACTER DETECTION AND RECOGNITION MODELS FOR ROBOTIC PROCESS AUTOMATION

FIELD

The present invention generally relates to robotic process automation (RPA), and more specifically, to training optical character detection and recognition (OCR) models to recognize text in images for RPA.

BACKGROUND

Robotic process automation (RPA) allows automation of the execution of repetitive and manually intensive activities. RPA can be used, for example, to interact with software applications through a user interface (UI), similar to how a human being would interact with the application. Interactions with the UI were typically performed by an RPA application using application programming interface (API) calls to a function that returns a set of coordinates (i.e., a "selector"). The RPA application can then use this information to simulate a mouse click of a button, for example, that causes the target application to act as if the user had manually clicked on the button.

Per the above, in a typical RPA implementation for native computing systems, the selectors work using the underlying properties of the textual elements of the UI to identify textual elements in the application (e.g., buttons, text fields, etc.). However, this technique breaks down when trying to analyze images, such as when trying to automate the same software in VDEs, such as those provided by Citrix®, VMWare®, VNC®, and Windows® (Windows® Remote Desktop). The reason for the breakdown is that VDEs stream an image of the remote desktop in a similar manner to how video streaming services do. There are no selectors to be identified in the images (i.e., "frames") of the video. This issue also arises when analyzing images (e.g., JPEG, GIF, PNG, BMP, etc.). The RPA application thus cannot make an API call to determine the location of a textual element to be provided to the application, for example. Attempts have been made to solve this challenge using conventionally trained optical character recognition (OCR) and image matching for VDE scenarios. However, these techniques have proven to be insufficiently reliable for RPA, which typically requires a high level of accuracy.

Computer Vision™ (CV) by UiPath®, for example, identifies graphical components by using a mix of artificial intelligence (AI), OCR, text fuzzy-matching, and an anchoring system. A CV model identifies the specific graphical elements in the image. This provides more accurate identification of graphical elements, such as text fields, buttons, check boxes, icons, etc.

To recognize graphical elements, AI algorithms, such as Faster Region-based Convolutional Neural Network (R-CNN), may be used. See, for example, Shaoqing Ren et al., Faster R-CNN: Towards Real-Time Object Detection with Region Proposal Networks, arXiv:1506.01497v3 (submitted Jun. 4, 2015). Faster R-CNN passes images of the target application interface through a ResNet with dilated convolutions (also called atrous convolutions) that output feature maps or tensors (i.e., a smaller image with 2048 channels). These feature maps are further passed through another neural network a region proposal network (RPN) that proposes thousands of possible rectangles where a graphical element of interest is believed to potentially have been found, as well as guesses with respect to what regions are believed to be graphical elements as a list of coordinates. The feature maps are grids and there are proposals (also called anchors) for each square on the grid. For each anchor, the RPN provides a classification. Further, there is a graphical element match score between 0 and 1 and a regression part indicating how far an anchor would need to be moved to match a particular graphical element. In other words, the RPN outputs regions where it thinks it found graphical elements, as well as what these graphical elements are believed to potentially be and associated probabilities.

Figure 1A:
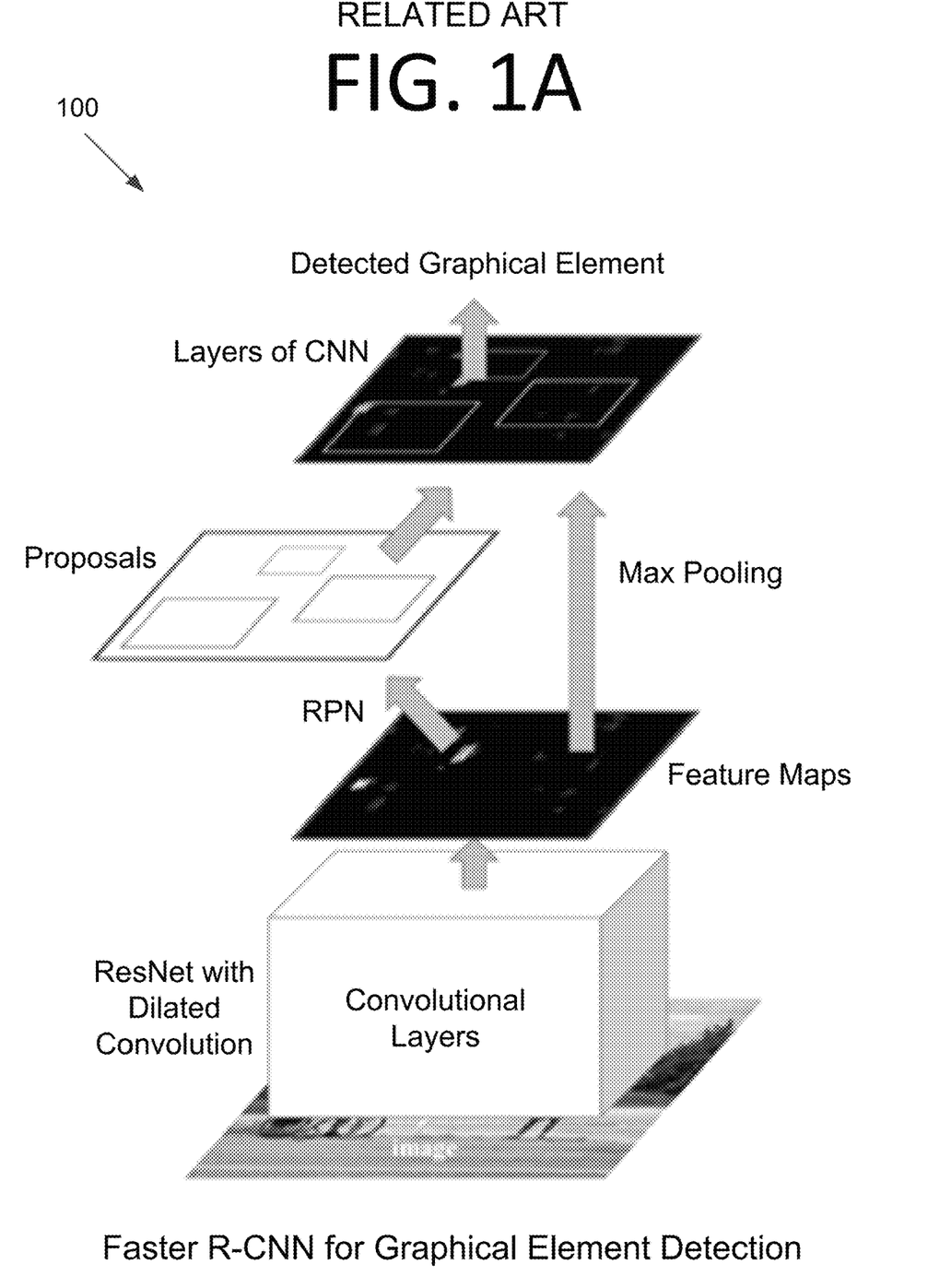
FIG. 1A illustrates an implementation of Faster R-CNN for graphical element detection.
Figure 1B:
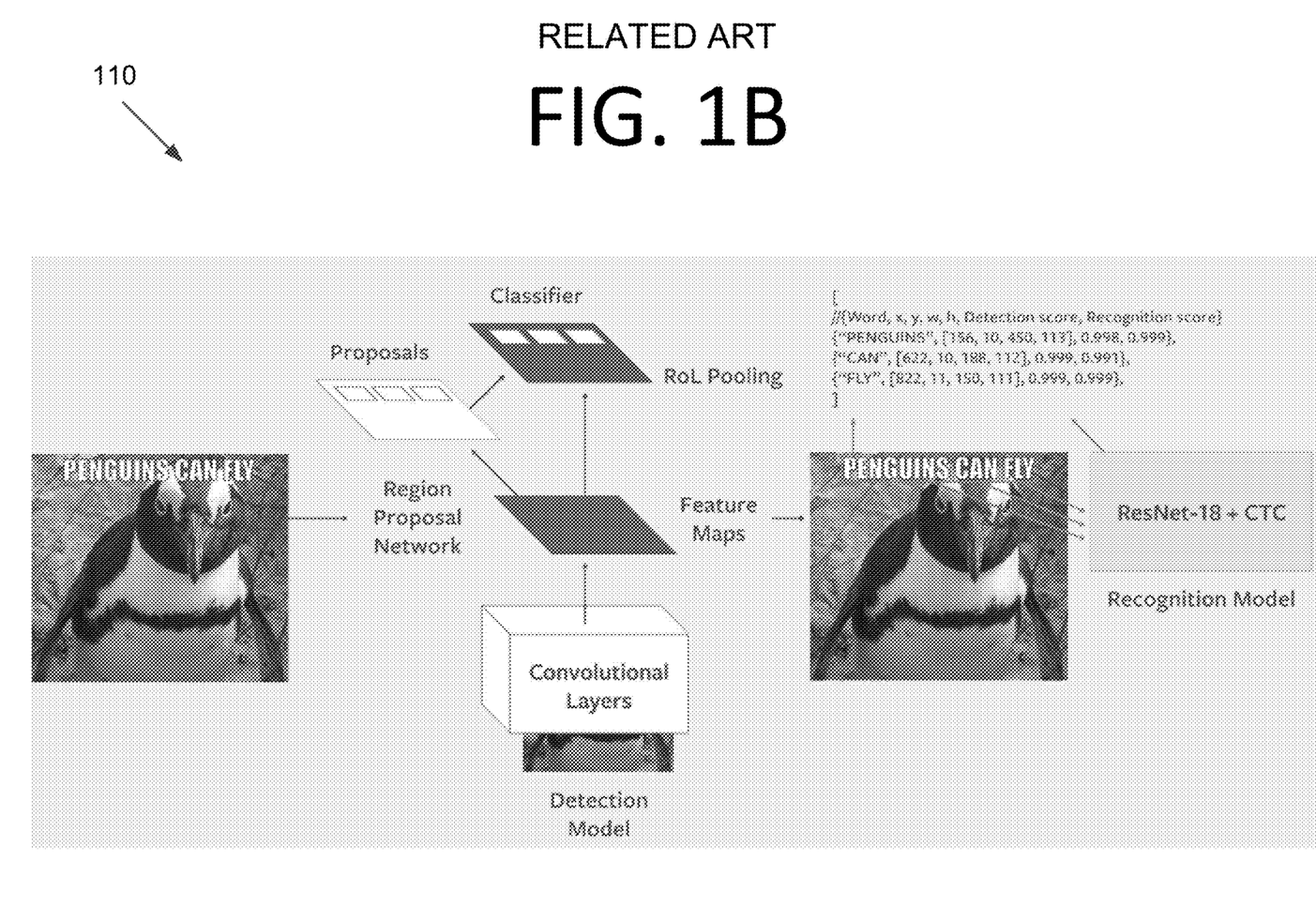
FIG. 1B is an architectural diagram illustrating the Rosetta® text recognition system from Facebook®.

With these proposals, many crops are made from the feature tensors output from the backbone ResNet. In these large feature tensors, feature dimensions are cropped. Cropped boxes are then passed again through a few layers of the CNN, which can output a more precise location and class distribution. Such an implementation 100 of Faster R-CNN for graphical element detection (e.g., detecting different graphical element types, where boxes of text may be identified as such in an image, but without detecting what the text actually is) is shown in FIG. 1A. For text recognition, a text recognition model may be used, such as the Rosetta® text recognition system 110 from Facebook® in FIG. 1B.

However, training OCR models for RPA is challenging, and conventional techniques do not typically yield sufficiently high confidence intervals. This training problem also differs from training a CV model to recognize graphical elements in the image. Thus, an improved approach to training OCR models for RPA that are robust to UI changes may be beneficial.

SUMMARY

Certain embodiments of the present invention may provide solutions to the problems and needs in the art that have not yet been fully identified, appreciated, or solved by current image analysis techniques. For example, some embodiments of the present invention pertain to training OCR models to detect and recognize text in images for RPA.

In an embodiment, a computer program is embodied on a non-transitory computer-readable medium. The program is configured to cause at least one processor to generate a first set of first synthetic data for training a text detection model for RPA. The first set of synthetic data includes images. The program is also configured to cause the at least one processor to train the text detection model using the generated first set of synthetic data over a plurality of epochs and at each epoch of the first plurality of epochs, evaluate performance of the text detection model against an evaluation dataset until a level of accuracy of the performance begins to decline. The program is further configured to cause the at least one processor to train the text detection model using a set of augmented human-labeled data over a second plurality of epochs and at each epoch of the second plurality of epochs, evaluate performance of the text detection model against the evaluation dataset until a level of accuracy of the performance begins to decline. The set of human-labeled data has at least an order of magnitude fewer images than the first set of synthetic data.

In another embodiment, a computer-implemented method includes generating a first set of first synthetic data for training a text detection model for RPA, by a computing system. The first set of synthetic data includes images. The computer-implemented method also includes training the text detection model, by the computing system, using the generated first set of synthetic data over a plurality of epochs and at each epoch of the first plurality of epochs, evaluating performance of the text detection model against an evaluation dataset, by the computing system, until a level of accuracy of the performance begins to decline. The computer-implemented method further includes training the text detection model, by the computing system, using a set of augmented human-labeled data over a second plurality of epochs and at each epoch of the second plurality of epochs, evaluating performance of the text detection model against the evaluation dataset, by the computing system, until a level of accuracy of the performance begins to decline. Additionally, the computer-implemented method includes generating a second set of synthetic data, by the computing system, training a text recognition model for RPA on the augmented human-labeled data and the second set of synthetic data over a third plurality of epochs, by the computing system, and at each epoch of the third plurality of epochs, evaluating performance of the text detection model against the evaluation dataset until a level of accuracy of the performance begins to decline, by the computing system.

In yet another embodiment, a computer-implemented method includes generating a set of synthetic data, by a computing system. The computer-implemented method also includes training a text recognition model for RPA on augmented human-labeled data and the set of synthetic data over a plurality of epochs, by the computing system, and at each epoch of the plurality of epochs, evaluating performance of the text detection model against the evaluation dataset until a level of accuracy of the performance begins to decline, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to training OCR models to detect and recognize text in images for RPA. The OCR model may include a text detection model and a text recognition model. The text detection and text recognition models may be trained separately and then combined to be used in production in an OCR model in some embodiments (e.g., by running the text detection model to identify where text is located and then running the text recognition model on portions of the image where text was recognized). In some embodiments, the text detection model may be based on a Faster R-CNN architecture using ResNet-50 as a backbone. The text detection model may first be trained on synthetic data only. The detection model may be evaluated against other, evaluation synthetic data.

When the detection model reaches a good level of accuracy (e.g., 97-98% or better using an F2 or F4 threshold for detection and approximately 2,000 epochs) and no longer makes progress on the evaluation synthetic data, the synthetic data training stage may be stopped. This accuracy level may be determined in some embodiments using an F1 score, an F2 score, an F4 score, or any other suitable technique without deviating from the scope of the invention. Training may then continue on real, human-labeled data with augmentations (e.g., scale, rotate, translate, change colors, any combination thereof, etc.), and performance may be evaluated on real data. By training in this manner, the detection model begins with a relatively high level of accuracy when it evaluates real data and the detection model tends to generalize better.

In some embodiments, it may not be known what accuracy level may be achieved. Accordingly, some embodiments may check whether the accuracy is starting to drop when analyzing the evaluation data (i.e., the model is performing well on the training data, but is starting to perform less well on the evaluation data). In certain embodiments, the trained OCR model including the text detection model and text recognition model may only be deployed if accuracy is superior to a currently deployed OCR model.

The text recognition model of some embodiments may use an architecture with ResNet-18 and a single long short term memory (LSTM) layer with connectionist temporal classification (CTC) for text decoding. Training may be performed on both real, human-labeled data and synthetic data at the same time. The same images may be used as for training the text detection and text recognition models in some embodiments. Some embodiments take approximately 200 passes (i.e., epochs) through the real and synthetic training data. In some embodiments, real and synthetic images may each have approximately 100 words, and approximately 500 real images and 500 synthetic images may be used in the training for each epoch. The words for the synthetic data may be newly generated for each epoch. Thus, over the 200 epochs in this example, approximately 10,000,000 synthetic words may be analyzed. However, any suitable number of images, words, and/or epochs may be used without deviating from the scope of the invention.

It is typically beneficial during training to have new images for the system to analyze, and since synthetic data can be generated at will, new synthetic images/words may be generated at each epoch, per the above. This may help to make training effective despite a relatively limited number of real, human-labeled images. Augmentations may be performed for training recognition, but evaluation may be on the real data only. A separate dataset may be used for end-to-end evaluation to determine whether the model is good enough for production.

Training typically makes the model perform better, but with too much training on a training set, the model may "learn" the training set too well and may not perform well on new data that is not in the training set. Accordingly, some embodiments use a separate set of data for evaluation of model performance at the step where the model performed best on the evaluation set. This helps to produce a model that performs well generally on unseen data.

In the OCR model, boxes that seem likely to contain text in an image may first be detected using the text detection model. Using a technique called "crop and resize," the candidate boxes may then be cut out of the original image and resized to a fixed height with variable width since words can have variable numbers of characters. The boxes may be combined into batches and run through the text recognition model (e.g., through ResNet (e.g., ResNet-18) with an LSTM layer to extract features before running the features through a CTC layer for decoding). The extracted features may be a matrix of numbers in a latent/hidden space and the network may have the freedom to choose the best features it can find to achieve good predictions. There is a correspondence with the original image, however. For instance, pixels on the left side of the image may only influence features on the left side of the matrix, somewhat akin to how features on the left side of an image remain on the left side when the image is resized.

CTC performs well at decoding a variable (usually longer) input to variable to a variable (usually shorter) output. In some embodiments, the CTC input is the transformed image (LSTM output) and the output is the prediction. Since each character in a word does not usually have the same width, it may not be known which pixels correspond to which character. CTC can calculate the best prediction in some embodiments by allowing a variable number of input features to correspond to one output character.

A much smaller set of human-labeled images (e.g., several hundred, 500, 1,000, etc.) than synthetic images may be used to train the OCR model in some embodiments. For instance, it was observed that an F1 score up to 90% was insufficient, and even up to 93% was making significant mistakes. However, some embodiments realize a detection accuracy of 95.8% or higher. It should be noted that any amount of human-labeled data may be used without deviating from the scope of the invention. However, this tends to be more time consuming and expensive.

After the OCR model (i.e., the text detection model and the text recognition model) reaches a sufficiently high level of accuracy on the real evaluation data, the OCR model may then be ready for production deployment. An RPA workflow may be generated that includes one or more activities calling the textual element detection model and the OCR model. A robot implementing the RPA workflow may then be generated and deployed, allowing end users to detect and recognize text for RPA purposes (e.g., for document processing, recognizing text in software applications displaying images on the user's screen, etc.).

Some embodiments employ an architecture for the text recognition model with ResNet-18 that uses layers of recurrent neural networks (RNNs) on top and a CTC layer to account for the fact that some letters are wider than others. While some conventional OCR techniques use multiple LSTM layers, this may require a longer period of time to train and execute since LSTM layers are expensive from a processing perspective. Certain embodiments use multiple LSTM layers, but it was determined that the benefit of using multiple LSTM layers over using a single LSTM layer was not large and did not justify the increased processing time for some applications. Thus, certain embodiments use a single LSTM layer with some modifications to the CNN layer (e.g., using fewer outputs form the CNN layer than ResNet-18) that achieve similar accuracy to or even better accuracy than embodiments using multiple LSTM layers.

When generating synthetic data, some embodiments attempt to programmatically generate images that are as close as possible to real images that the OCR model will encounter after deployment. Scripts may be used to place words in an image, add some noise, configure the image in blocks (e.g., paragraphs, boxes that are like tables, boxes that include randomly placed words, etc.), etc., similar to how the text tends to appear on a computing system display. For instance, the image may first be partitioned into parts (or windows). Each window may randomly be assigned a type (e.g., paragraph, random text, table, etc.). Each window type may have a different way of placing objects in that window. For instance, paragraphs may add objects one after another in lines of objects, similar to a paragraph of written text. Random text may be objects placed in random locations in that window. Tables may place objects aligned in a table structure.

Objects may be text objects including words or different objects with no text. Text objects may have random background colors and assigned text that is distinct enough (e.g., in RGB value) to be distinguishable from the background text. Text may be assigned from a dictionary (e.g., based on real text), numbers, date formats, randomly generated sequences of characters, any combination thereof, etc. Non-text objects may be imported from a list of images, randomly drawn polygons, noise generated points, any combination thereof, etc. Objects may be scaled and rotated (e.g., rotated 0-5 degrees). Text objects may be generated based on a list of fonts that are compared to the real images in some embodiments.

Some embodiments add elements such as icons with no text, random noise (e.g., randomly added dots of various sizes and shapes), drawing random polygons (e.g., based on a random number and/or location of interconnected vertices) in the image of various types, shapes, and sizes, etc. Per the above, a very large amount of synthetic data may be generated since this can be readily achieved with the hardware capabilities existing computing systems.

The synthetic data is typically not exactly like real data. For instance, rather than using actual images of running applications with menus, icons with text, shadows, artifacts from computer resolution or image compression, some embodiments include randomly placed text objects and/or non-text objects in the synthetic images. Synthetically generated images may be scaled, the image may be made larger or smaller, the image and/or elements therein may be rotated, colors may be changed, the image and/or elements therein may be stretched, translated, flipped, etc.

Some embodiments use this synthetic data as a "model bootstrap" to train the text detection model to a detection accuracy that is sufficient to begin training the text detection model on real, human-tagged images. A much smaller sample of human-tagged data may be used in some embodiments since this data is typically much more expensive and time consuming to generate, per the above. The synthetic data training phase allows the text detection model to become accurate based off of a relatively small number of real samples.

This human-tagged data may be modified to improve accuracy in training. "Image augmentation" may be performed (e.g., padding, rotation, color changes (e.g., grayscale, inverse coloring, channel permutations, hue shift, etc.), scaling, cropping, adding random noise (e.g., random points/lines), adding JPEG noise, scaling and scaling back, etc.). In addition to improving text recognition accuracy, this may also make predictions more stable. In other words, predictions may not change significantly when the image is slightly changed. Text is different from other image components since if you scale text too much (e.g., via shrinking), the ability to recognize the text may be lost.

Some embodiments may be trained to recognize text on a screen in a desired number of fonts since such text tends to be relatively similar from one image to another. A list of commonly used fonts may be built, and text in these fonts may be randomly chosen and mixed (e.g., different fonts, spacings, orientations, sizes, etc.). Sizes and spacings tend to vary from one font to another, for example. Certain embodiments may be trained to recognize handwritten text. However, this training process may be more extensive and require more synthetic and real samples since there is a much wider degree of variation in handwritten text from one individual to another.

In certain embodiments, a relatively small number of character types may be used (e.g., 100 different characters, which is smaller than the ASCII character set). For some embodiments, such as those employed to recognize text in invoices, this may encompass most or all of the characters that are likely to be encountered in production (e.g., where invoices are in English and contain dollar values for a certain end user). A more limited character set also helps to improve the speed with which the OCR model can be trained and may improve accuracy. Since fewer characters are used, the real data can be focused on this smaller set of characters. The OCR model will see more examples of each of these characters during training and will thus learn to detect these characters more effectively. Real images are difficult to tag for OCR. It can take a human over an hour per image even when starting with pre-loaded predictions from an already trained OCR model. Thus, reducing the need for real images is a significant advantage of some embodiments.

After training, the OCR model may be relatively large and not fast enough for some implementations where results are required quickly and/or where a computing system running the OCR model has insufficient processing power. Accordingly, some embodiments use the larger OCR model to train a smaller and faster OCR model. The larger OCR model may be used initially to learn from all of the training data. This larger model can then be used to provide labels for a smaller model. The smaller model will be faster and may have more data for training since some predictions from the larger OCR model may be used.

With some conventional OCR technologies, there is an issue that arises around splitting words. For example, there is no standard way to figure out what constitutes a "word" (e.g., a token) that the OCR algorithm should output. Considering Google® OCR, for example, punctuation (e.g., commas, periods, semicolons, question marks, exclamation points, etc.) is used to separate words. However, where a floating point number is included, such as the monetary value 101.11, this would be separated into the three tokens "101", ".", and "11".

Some embodiments may apply a geometrical solution to this problem. Words may be split based on a spacing threshold distance. For instance, "$100" may be recognized as one single word, but "$ 100" may be recognized as two separate words. Commas, semicolons, etc. may be assigned to the preceding word.

In some embodiments, postprocessing is performed that combines boxes based on rules. For instance, currency may be accommodated by appending a currency symbol to a value, recognizing floating point numbers where characters are at a relatively large distance (e.g., due to the way receipts may be written), performing date formatting, etc.

Some embodiments are able to recognize that currency values should be grouped into a single word by applying certain rules. For instance, if this number is preceded by a currency sign (e.g., $, €, £, ¥, etc.), the subroutine may be generally written as:

```
START
    Append each integer following currency sign to word;
    If not an integer or decimal point, ignore;
    If a decimal point is found with at least one number thereafter:
        Append decimal point;
        Append each integer after decimal point;
END
```

Such a subroutine could also accommodate floating point numbers that are likely currency, but do not have a currency sign, by first searching adjacent characters having numbers for a decimal point located therebetween, but ending in a two-integer number after the decimal point.

To improve the speed of OCR model execution, some element may be processed using CPUs and others may be processed using GPUs. While running an OCR model, while most operations are faster on a GPU, there is an added cost to moving all data for GPU processing (i.e., a memory copy from the CPU to the GPU), some functions are not implemented effectively for GPUs, etc. For speed purposes, GPUs may be used most of the time, but augmented with CPU processing to improve speed.

In some embodiments, it is desirable to not only identify what elements include text, but also to identify what elements do not include text. For example, an OCR algorithm may initially identify an edge of a button as a parenthesis. Negative rules help the system to make such distinctions. This can be an issue starting with the synthetic data generation stage, where it is more difficult to provide quality negative examples in generated data. Real images tend to have various artifacts without text, which can be hard to replicate since they tend to be numerous. In order to assist in training, icons, random boxes taken from images (while not overlapping with text), and graphical elements that lead to bad predictions may be incorporated.

The data for training an OCR model tends to differ substantially from the data used to train a graphical component detection model, for example. In graphical element detection, boxes around edges of a component may not need to be perfect. If the boxes are not drawn very accurately for detecting buttons, for example, this tends not to impact accuracy as much. However, for text, if the box is not accurately drawn (e.g., a bit to the right), the box may no longer be considered to contain the first letter. Thus, the OCR model stage would not be able to identify the correct word. In other words, for text, if boxes are too small and letters intersect with edges of graphical components, the letters may not be recognized. For instance, if the tail of the letter "p" is cut off by an edge, the OCR model may determine that the character looks more similar to an "a" and identify it as such. More emphasis may thus be placed on edges of graphical components in textual element detection model training and in tagging. A model that provides more accurate box margins may be employed in some embodiments, such as cascade R-CNN.

Per the above, in some embodiments, video images may come from a VDE server, and may be of a visual display or a part thereof. Some example VMs include, but are not limited to, those provided by Citrix®, VMWare®, VNC®, Windows® Remote Desktop, etc. However, images may also come from other sources, including, but not limited to, Flash, Silverlight, or PDF documents, image files of various formats (e.g., JPG, BMP, PNG, etc.), or any other suitable image source without deviating from the scope of the invention. Such images may include, but are not limited to, a window, a document, a financial receipt, an invoice, etc.

Figure 2:
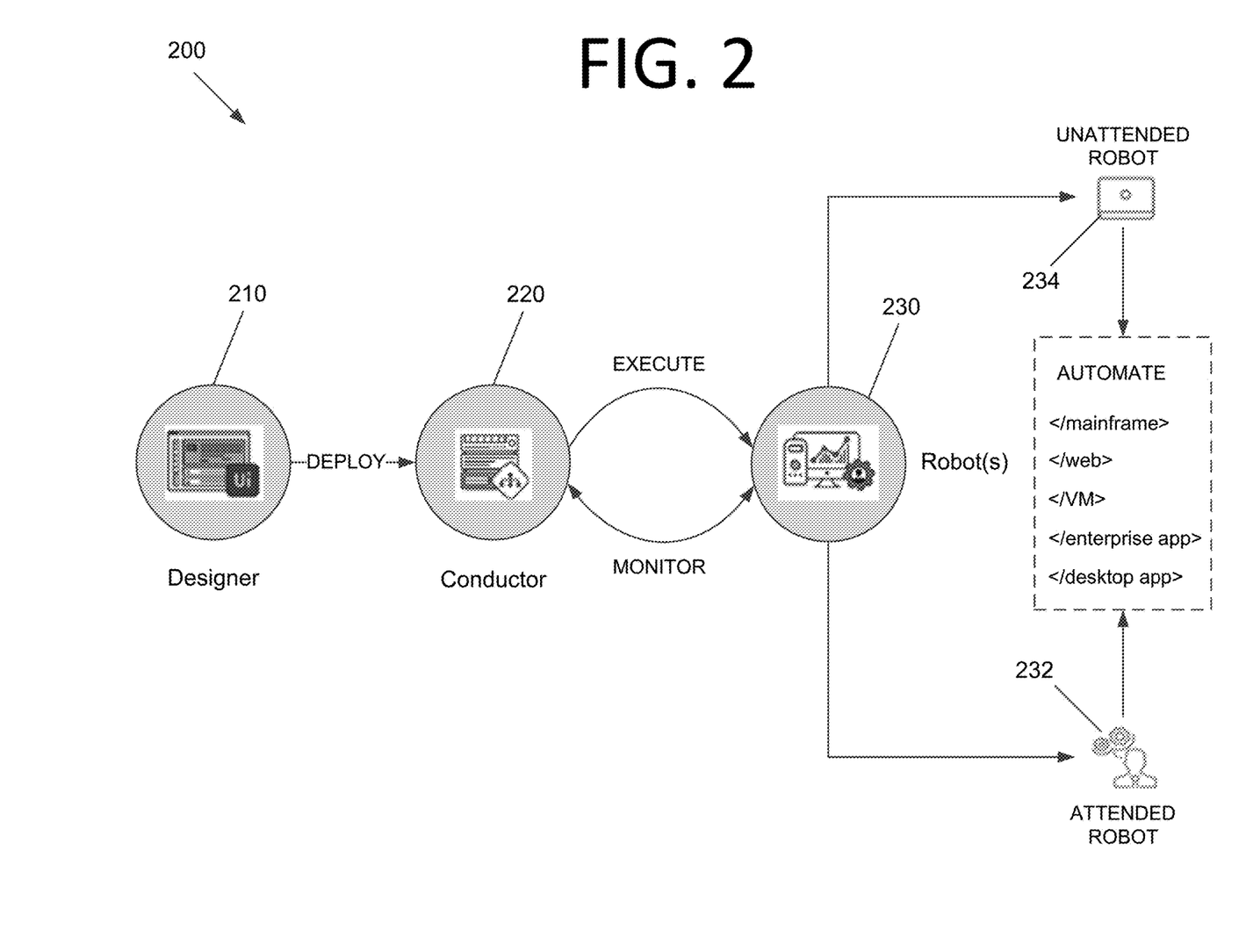
FIG. 2 is an architectural diagram illustrating an RPA system, according to an embodiment of the present invention.

FIG. 2 is an architectural diagram illustrating an RPA system 200, according to an embodiment of the present invention. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended Robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that run workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 3:
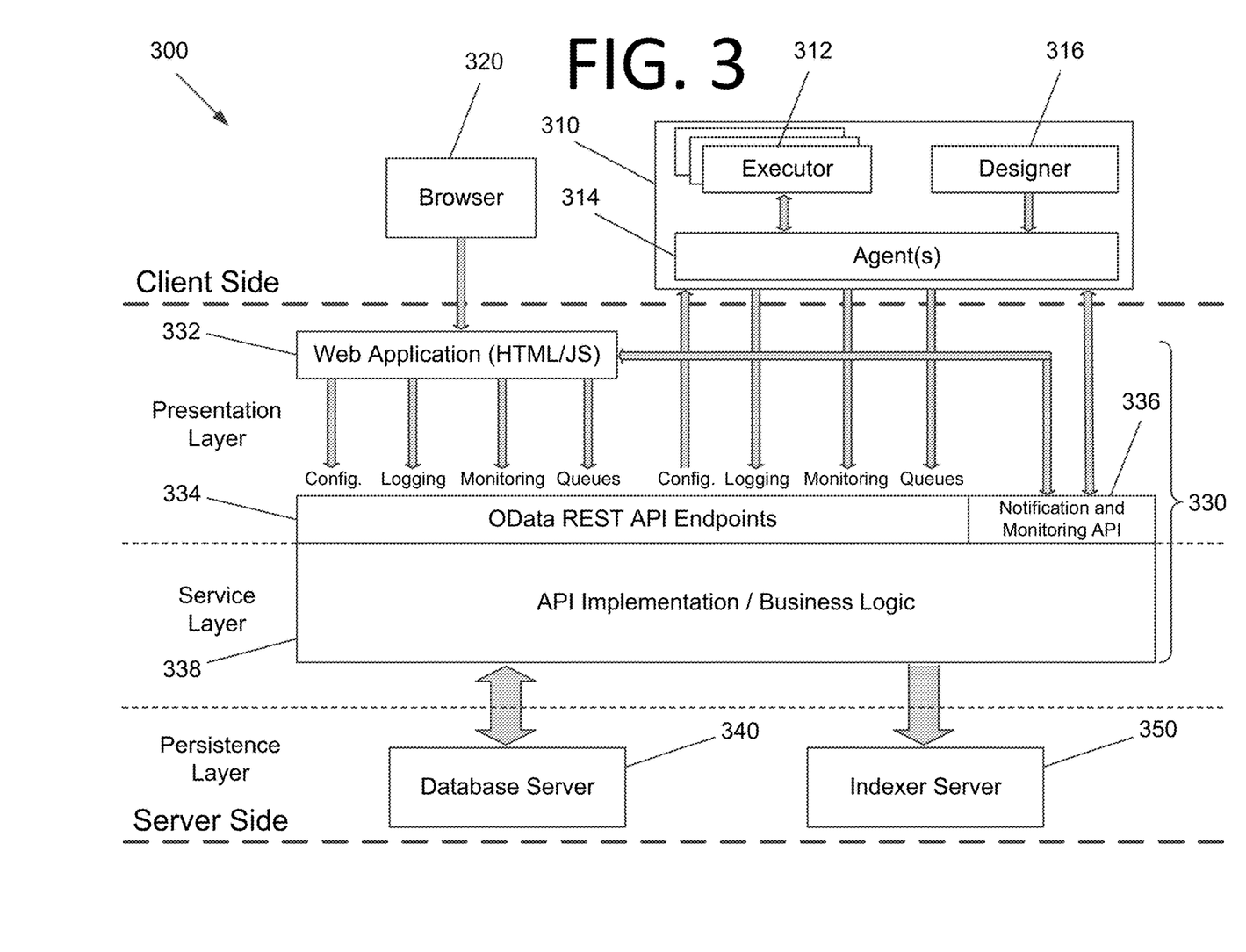
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be, or may be a part of, RPA system 200 of FIG. 2. It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on computing system 310. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 330, which processes them further via database server 340, indexer server 350, or both. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), there multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 330 is always initiated by agent 314 in some embodiments. In the notification scenario, agent 314 may open a WebSocket channel that is later used by conductor 330 to send commands to the robot (e.g., start, stop, etc.).

On the server side, a presentation layer (web application 332, Open Data Protocol (OData) Representative State Transfer (REST) Application Programming Interface (API) endpoints 334, and notification and monitoring 336), a service layer (API implementation/business logic 338), and a persistence layer (database server 340 and indexer server 350) are included. Conductor 330 includes web application 332, OData REST API endpoints 334, notification and monitoring 336, and API implementation/business logic 338. In some embodiments, most actions that a user performs in the interface of conductor 320 (e.g., via browser 320) are performed by calling various APIs. Such actions may include, but are not limited to, starting jobs on robots, adding/removing data in queues, scheduling jobs to run unattended, etc. without deviating from the scope of the invention. Web application 332 is the visual layer of the server platform. In this embodiment, web application 332 uses Hypertext Markup Language (HTML) and JavaScript (JS). However, any desired markup languages, script languages, or any other formats may be used without deviating from the scope of the invention. The user interacts with web pages from web application 332 via browser 320 in this embodiment in order to perform various actions to control conductor 330. For instance, the user may create robot groups, assign packages to the robots, analyze logs per robot and/or per process, start and stop robots, etc.

In addition to web application 332, conductor 330 also includes service layer that exposes OData REST API endpoints 334. However, other endpoints may be included without deviating from the scope of the invention. The REST API is consumed by both web application 332 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 330. Queueing REST endpoints may be responsible for queues and queue item management, such as adding data to a queue, obtaining a transaction from the queue, setting the status of a transaction, etc.

Monitoring rest endpoints monitor web application 332 and agent 314. Notification and monitoring API 336 may be REST endpoints that are used for registering agent 314, delivering configuration settings to agent 314, and for sending/receiving notifications from the server and agent 314. Notification and monitoring API 336 may also use WebSocket communication in some embodiments.

The persistence layer includes a pair of servers in this embodiment—database server 340 (e.g., a SQL server) and indexer server 350. Database server 340 in this embodiment stores the configurations of the robots, robot groups, associated processes, users, roles, schedules, etc. This information is managed through web application 332 in some embodiments. Database server 340 may manages queues and queue items. In some embodiments, database server 340 may store messages logged by the robots (in addition to or in lieu of indexer server 350).

Indexer server 350, which is optional in some embodiments, stores and indexes the information logged by the robots. In certain embodiments, indexer server 350 may be disabled through configuration settings. In some embodiments, indexer server 350 uses ElasticSearch®, which is an open source project full-text search engine. Messages logged by robots (e.g., using activities like log message or write line) may be sent through the logging REST endpoint(s) to indexer server 350, where they are indexed for future utilization.

Figure 4:
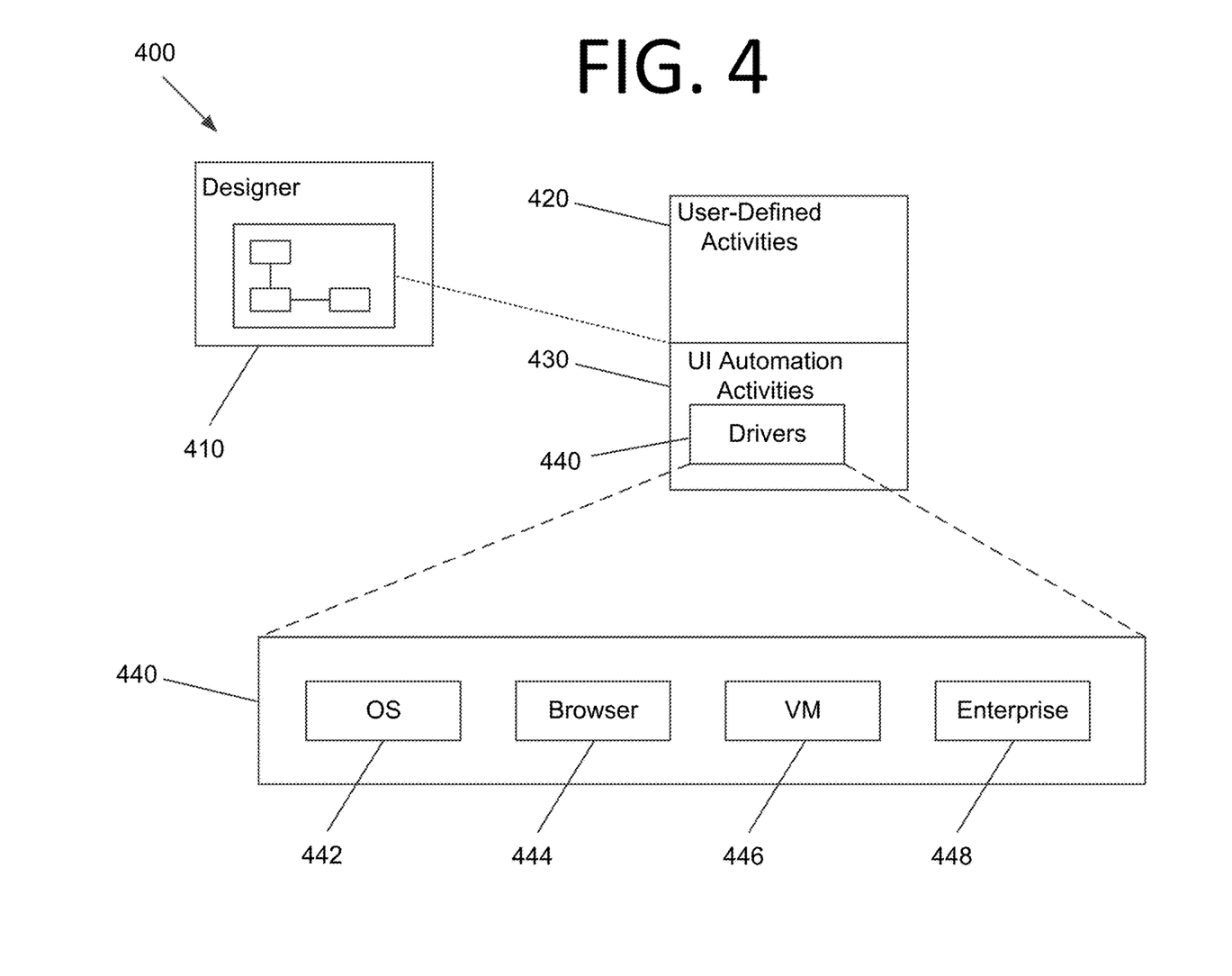
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, and drivers 440, according to an embodiment of the present invention. Per the above, a developer uses designer 410 to develop workflows that are executed by robots. Workflows may include user-defined activities 420 and UI automation activities 430. Some CV activities may include, but are not limited to, click, type, get text, hover, element exists, refresh scope, highlight, etc. Click in some embodiments identifies an element using CV, OCR, fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 410. However, any number and/or type of activities may be available without deviating from the scope of the invention.

UI automation activities 430 are a subset of special, lower level activities that are written in lower level code (e.g., CV activities) and facilitate interactions with the screen. UI automation activities 430 facilitate these interactions via drivers 440 that allow the robot to interact with the desired software. For instance, drivers 440 may include OS drivers 442, browser drivers 444, VM drivers 446, enterprise application drivers 448, etc.

Drivers 450 may interact with the OS at a low level looking for hooks, monitoring for keys, etc. They may facilitate integration with Chrome®, IE®, Citrix®, SAP®, etc. For instance, the "click" activity performs the same role in these different applications via drivers 450.

Figure 5:
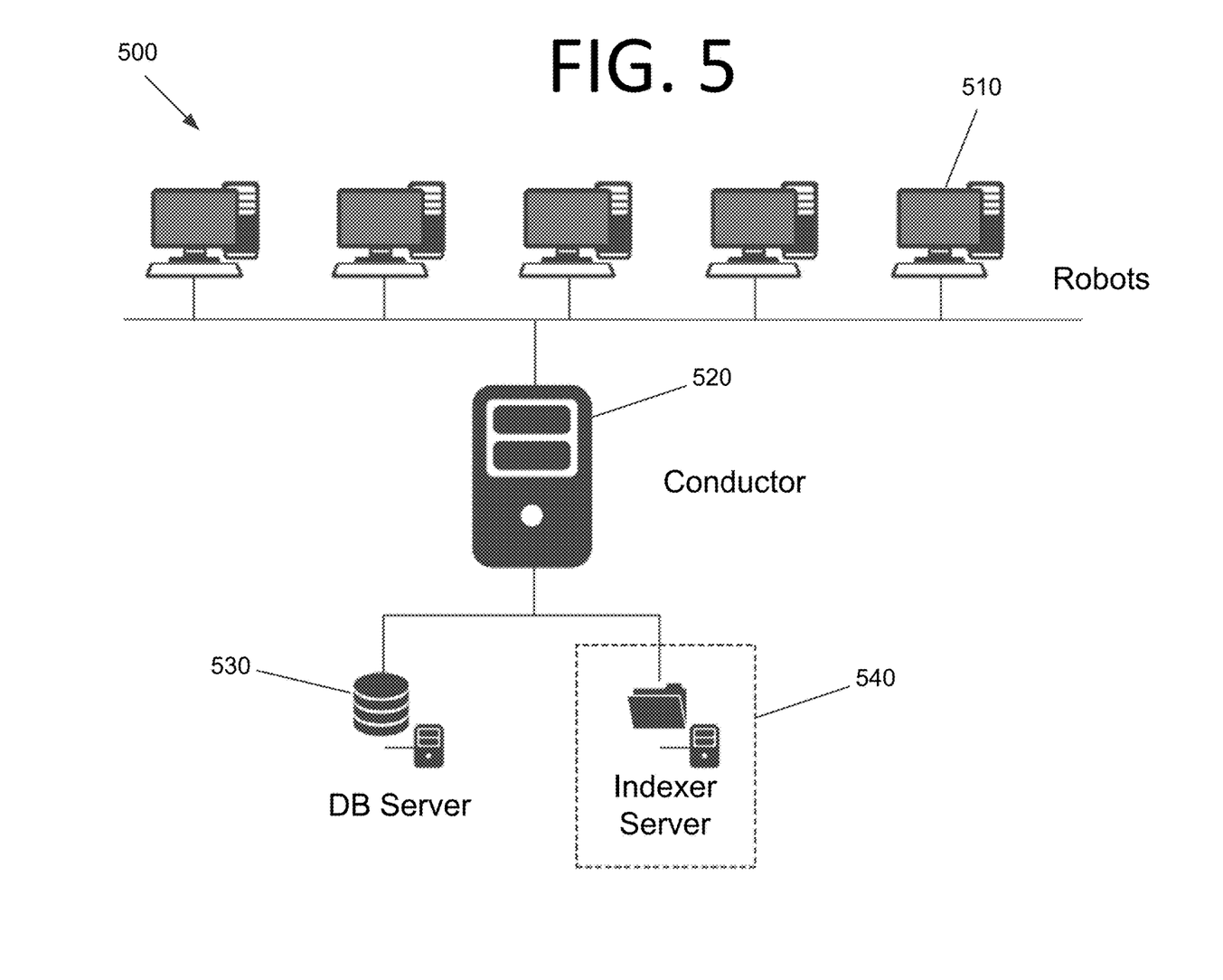
FIG. 5 is an architectural diagram illustrating an RPA system, according to an embodiment of the present invention.

FIG. 5 is an architectural diagram illustrating an RPA system 500, according to an embodiment of the present invention. In some embodiments, RPA system 500 may be or include RPA systems 200 and/or 300 of FIGS. 2 and/or 3. RPA system 500 includes multiple client computing systems 510 running robots. Computing systems 510 are able to communicate with a conductor computing system 520 via a web application running thereon. Conductor computing system 520, in turn, is able to communicate with a database server 530 and an optional indexer server 540.

With respect to FIGS. 3 and 5, it should be noted that while a web application is used in these embodiments, any suitable client/server software may be used without deviating from the scope of the invention. For instance, the conductor may run a server-side application that communicates with non-web-based client software applications on the client computing systems.

Figure 6:
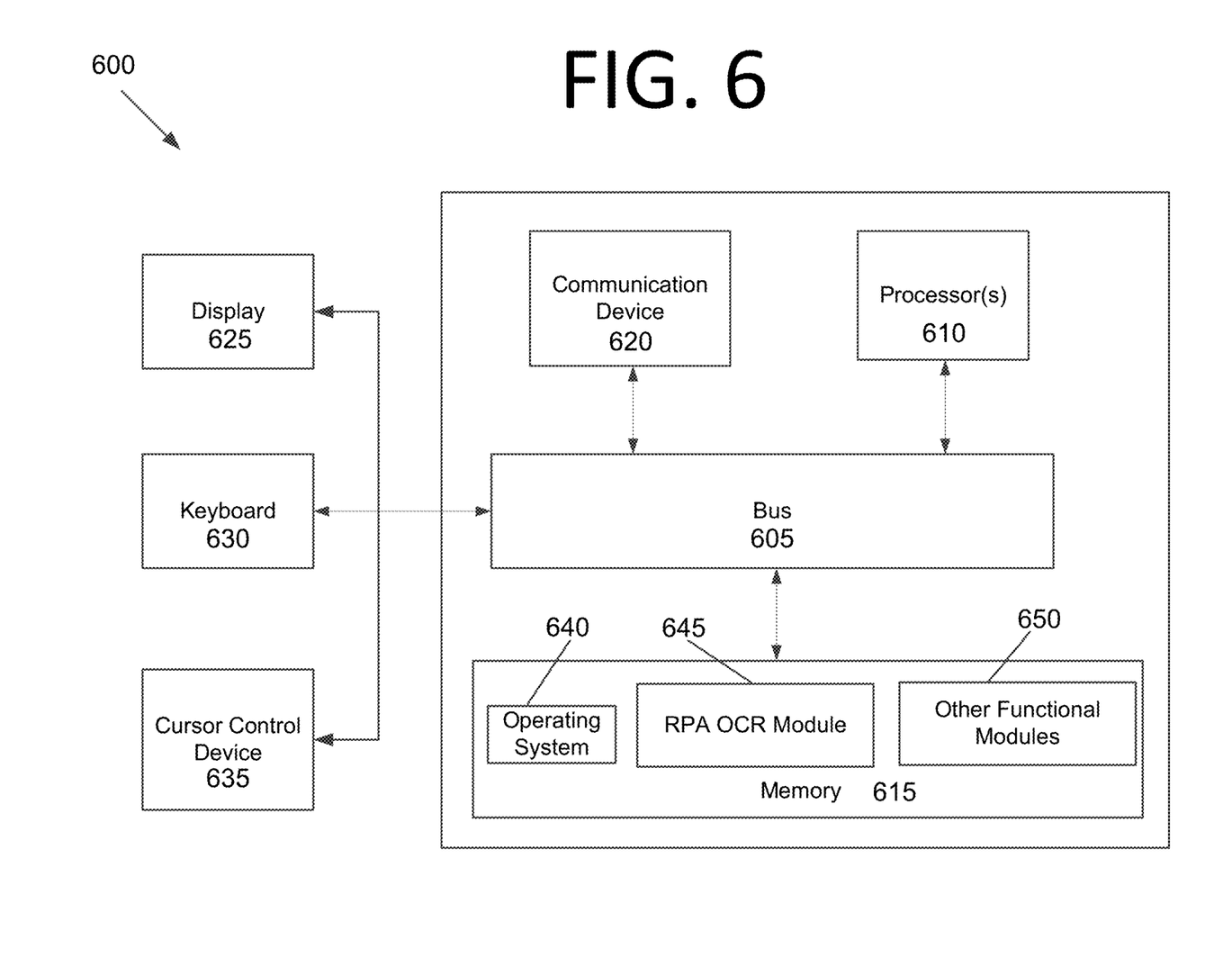
FIG. 6 is an architectural diagram illustrating a computing system configured to train an OCR model to detect and recognize text in images for RPA, according to an embodiment of the present invention.

FIG. 6 is an architectural diagram illustrating a computing system 600 configured to train an OCR model to detect and recognize text in images for RPA, according to an embodiment of the present invention, according to an embodiment of the present invention. In some embodiments, computing system 600 may be one or more of the computing systems depicted and/or described herein. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 620 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beamsteering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system 600. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 615 stores software modules that provide functionality when executed by processor(s) 610. The modules include an operating system 640 for computing system 600. The modules further include an RPA OCR module 645 that is configured to perform all or part of the processes described herein or derivatives thereof. Computing system 600 may include one or more additional functional modules 650 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 7:
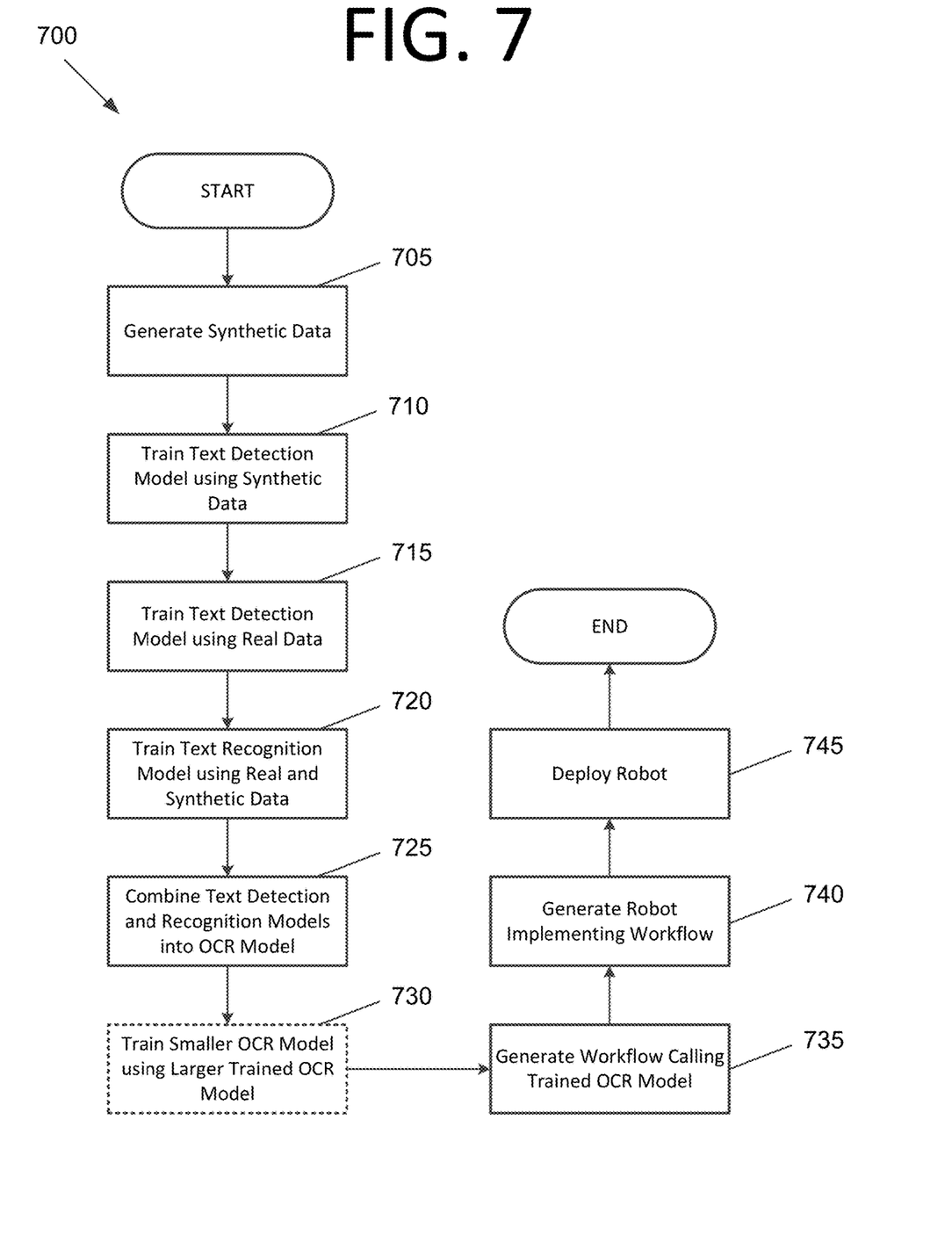
FIG. 7 is a flowchart illustrating a process for training an OCR model to detect and recognize text in images for RPA, according to an embodiment of the present invention.

FIG. 7 is a flowchart illustrating a process 700 for training an OCR model to detect and recognize text in images for RPA, according to an embodiment of the present invention. The process begins with generating synthetic data for training a text detection model at 705. A large amount of synthetic training data may be generated for initial training of the text detection model. In some embodiments, the text detection model may be based on a Faster R-CNN architecture using ResNet-50 as a backbone and may draw boxes around components that are believed to include text, or to be text themselves. The text detection model is then trained over multiple epochs until it reaches its best level of accuracy against an evaluation dataset at 710. Training then continues on real, human-labeled data with augmentations (e.g., scale, rotate, translate, change colors, any combination thereof, etc.) at 715 until the best accuracy against the evaluation dataset is achieved.

A text recognition model is then trained on the real and synthetic data at the same time over multiple epochs at 720. The text recognition model of some embodiments may use an architecture with ResNet-18 and a single LSTM layer with CTC for text decoding. The same images may be used as for training the text detection and text recognition models in some embodiments. In certain embodiments, new synthetic images/words are generated for each epoch to make training more effective despite a relatively limited number of real, human-labeled images (e.g., 500 or less in some embodiments). In certain embodiments, augmentations are performed on the training data, but evaluation is on the real data only. A separate dataset may be used in some embodiments for end-to-end evaluation to determine whether the OCR model is good enough for production or superior to an existing OCR model.

When generating the synthetic data, some embodiments attempt to programmatically generate images that are as close as possible to real images that the OCR model will encounter after deployment. Scripts may be used to place words in an image, add some noise, configure the image in blocks (e.g., paragraphs, boxes that are like tables, boxes that include randomly placed words, etc.), etc., similar to how the text tends to appear on a computing system display. In some embodiments, various elements may be added to the training images, such as icons with no text, boxes and bottom edges without text, random noise (e.g., randomly added dots of various sizes and shapes), drawing random polygons in the image of various types, shapes, and sizes, etc. Per the above, a very large amount of synthetic data may be generated since this can be readily achieved with the hardware capabilities existing computing systems. The synthetic data is not exactly like real data in some embodiments. In certain embodiments, the synthetic data for training the text detection and/or recognition model may include negative examples. Providing negative examples in addition to positive examples may help to make the synthetic data more effective for training purposes. Icons, random boxes taken from images (while not overlapping with text), graphical elements that lead to bad predictions, etc. may be incorporated as negative examples.

In some embodiments, the OCR model may determine that floating point numbers, dates, etc. are a single word. In certain embodiments, the speed of OCR model execution may be increased by processing some elements using CPUs and other elements using GPUs. In some embodiments, the OCR model determines not only what elements include text, but also what elements to do not include text.

A much smaller sample of human-tagged data may be trained in some embodiments since this data is typically much more expensive and time consuming to generate. The synthetic data training phase allows the OCR model to become accurate based off of a relatively small number of real samples. This human-tagged data may be modified to improve accuracy via training. For example, labeled images may be scaled, the image may be made larger or smaller, the image and/or elements therein may be rotated, colors may be changed, the image and/or elements therein may be stretched, translated, flipped, etc. Text is different from graphical components since if you scale text too much (e.g., via shrinking), the ability to recognize the text may be lost.

Some embodiments may be trained to recognize text on a screen in a desired number of fonts since such text tends to be relatively similar from one image to another. A list of commonly used fonts may be built, and text in these fonts may be randomly chosen and mixed (e.g., different fonts, spacings, orientations, sizes, etc.). Sizes and spacings tend to vary from one font to another, for example. Certain embodiments may be trained to recognize handwritten text. However, this training process may be more extensive and require more synthetic and real samples since there is a much wider degree of variation in handwritten text from one individual to another.

In certain embodiments, a relatively small number of character types may be used (e.g., 100 different characters, which is smaller than the ASCII character set). For some embodiments, such as those employed to recognize text in invoices, this may encompass most or all of the characters that are likely to be encountered in production (e.g., where invoices are in English and contain dollar values for a certain end user). A more limited character set also helps to improve the speed with which the OCR model can be trained, and may improve accuracy.

Once the text detection and text recognition models have been trained, they are combined into an OCR model at 725. In some embodiments, after training, the OCR model may be relatively large and not fast enough for some implementations where results are required quickly and/or where a computing system running the OCR model has insufficient processing power. Accordingly, in some embodiments, the larger OCR model is used to train a smaller and faster OCR model at 730.

A workflow that includes an activity calling the trained OCR model is generated at 735. This may be the initial, larger OCR model and/or the smaller OCR model of step 730. A robot implementing the workflow is then generated at 740, and the robot is deployed at 745.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 610 of computing system 600 of FIG. 6) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the program configured to cause at least one processor to:
generate a first set of first synthetic data for training a text detection model for robotic process automation (RPA), the first set of synthetic data comprising images;
train the text detection model using the generated first set of synthetic data over a first plurality of epochs;
at each epoch of the first plurality of epochs, evaluate performance of the text detection model against an evaluation dataset until a level of accuracy of the performance begins to decline;
train the text detection model using a set of augmented human-labeled data over a second plurality of epochs; and
at each epoch of the second plurality of epochs, evaluate performance of the text detection model against the evaluation dataset until a level of accuracy of the performance begins to decline, wherein
the set of human-labeled data has at least an order of magnitude fewer images than the first set of synthetic data.

2. The computer program of claim 1, wherein the text detection model is configured to detect boxes in the images of the first set of synthetic data that comprise text, cut the detected boxes from the respective images of the first set of synthetic data, and resize the cut boxes.

3. The computer program of claim 1, wherein the generation of the first set of synthetic data comprises placing words in images, adding random noise, configuring the images in blocks, or any combination thereof.

4. The computer program of claim 1, wherein the generation of the first set of synthetic data comprises adding icons with no text, drawing random polygons in one or more of the images of various types, shapes, and/or sizes, or any combination thereof.

5. The computer program of claim 1, wherein the generation of the first set of synthetic data comprises generating negative examples.

6. The computer program of claim 1, wherein new synthetic data is generated for each epoch of the third plurality of epochs.

7. The computer program of claim 1, wherein the text recognition model is configured to determine floating point numbers or dates as single words.

8. The computer program of claim 1, wherein a number of character types recognized by the text recognition model is less than or equal to 100.

9. The computer program of claim 1, wherein the program is further configured to cause the at least one processor to:
combine the text detection model and the text recognition model into an optical character recognition (OCR) model.

10. The computer program of claim 9, wherein the program is further configured to cause the at least one processor to:
train a smaller, faster OCR model using the OCR model.

11. The computer program of claim 9, wherein the program is further configured to cause the at least one processor to:
generate a workflow comprising an activity calling the OCR model;
generate a robot implementing the workflow; and
deploy the robot.

12. The computer program of claim 1, wherein the generation of the first set of synthetic data comprises building a list of fonts and randomly choosing, mixing, and inserting text in these fonts into the synthetic data.

13. A computer-implemented method, comprising:
generating a first set of first synthetic data for training a text detection model for robotic process automation (RPA), by a computing system, the first set of synthetic data comprising images;
training the text detection model, by the computing system, using the generated first set of synthetic data over a first plurality of epochs;
at each epoch of the first plurality of epochs, evaluating performance of the text detection model against an evaluation dataset, by the computing system, until a level of accuracy of the performance begins to decline;
training the text detection model, by the computing system, using a set of augmented human-labeled data over a second plurality of epochs;
at each epoch of the second plurality of epochs, evaluating performance of the text detection model against the evaluation dataset, by the computing system, until a level of accuracy of the performance begins to decline;
generating a second set of synthetic data, by the computing system;
training a text recognition model for RPA on the augmented human-labeled data and the second set of synthetic data over a third plurality of epochs, by the computing system; and
at each epoch of the third plurality of epochs, evaluating performance of the text detection model against the evaluation dataset until a level of accuracy of the performance begins to decline, by the computing system.

14. The computer-implemented method of claim 13, wherein new synthetic data is generated for each epoch of the third plurality of epochs.

15. The computer-implemented method of claim 13, further comprising:
combining the text detection model and the text recognition model into an optical character recognition (OCR) model, by the computing system.

16. The computer-implemented method of claim 15, further comprising:
generating a workflow comprising an activity calling the OCR model, by the computing system;
generating a robot implementing the workflow, by the computing system; and
deploying the robot, by the computing system.

* * * * *